US012666422B2

(12) United States Patent
Dimou et al.

(10) Patent No.: US 12,666,422 B2
(45) Date of Patent: Jun. 23, 2026

(54) USER EQUIPMENT SYNCHRONIZATION WITH A SYNCHRONIZATION-SIGNAL-BLOCK-LESS CARRIER

(71) Applicant: QUALCOMM Incorporated, San Diego, CA (US)

(72) Inventors: Konstantinos Dimou, New York, NY (US); Rebecca Wen-Ling Yuan, San Diego, CA (US); Hung Dinh Ly, San Diego, CA (US); Hari Sankar, San Diego, CA (US); Peter Zillmann, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/446,370

(22) Filed: Aug. 8, 2023

(65) Prior Publication Data

US 2024/0073897 A1    Feb. 29, 2024

Related U.S. Application Data

(60) Provisional application No. 63/373,263, filed on Aug. 23, 2022.

(51) Int. Cl.
*H04W 72/1273* (2023.01)
*H04W 56/00* (2009.01)
*H04W 72/232* (2023.01)

(52) U.S. Cl.
CPC ..... *H04W 72/1273* (2013.01); *H04W 56/001* (2013.01); *H04W 72/232* (2023.01)

(58) Field of Classification Search
CPC .......... H04W 72/1273; H04W 56/001; H04W 72/232; H04W 74/0833; H04W 56/0045; H04L 5/001; H04L 5/0098
See application file for complete search history.

(56) References Cited

U.S. PATENT DOCUMENTS

| | | | |
|---|---|---|---|
| 2015/0071198 A1 | 3/2015 | Deng | |
| 2015/0208269 A1* | 7/2015 | Damnjanovic | ....... H04L 5/0098 |
| | | | 370/252 |
| 2015/0264678 A1* | 9/2015 | Yin | ........... H04L 5/00 |
| | | | 370/329 |
| 2020/0383167 A1* | 12/2020 | Sengupta | ........... H04B 7/06964 |
| 2022/0408464 A1* | 12/2022 | MolavianJazi | ... H04W 72/1273 |

(Continued)

OTHER PUBLICATIONS

International Search Report and Written Opinion—PCT/US2023/029878—ISA/EPO—Dec. 6, 2023.

(Continued)

*Primary Examiner* — Andrew W Chriss
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node associated with a first carrier, a downlink control information (DCI) transmission indicative of synchronization information corresponding to a second carrier, wherein the second carrier comprises a synchronization-signal-block-less (SSB-less) carrier. The UE may communicate via the second carrier based on the synchronization information. Numerous other aspects are described.

30 Claims, 11 Drawing Sheets

600 ⟶

(56)                    References Cited

U.S. PATENT DOCUMENTS

| | | | |
|---|---|---|---|
| 2023/0389120 A1* | 11/2023 | Babaei | H04W 52/0235 |
| 2024/0178950 A1* | 5/2024 | Shi | H04L 5/0098 |
| 2024/0267927 A1* | 8/2024 | Matsumura | H04W 52/08 |
| 2025/0008458 A1* | 1/2025 | Bergström | H04W 56/0015 |

OTHER PUBLICATIONS

Qualcomm Incorporated: "Network Energy Saving Techniques", 3GPP TSG RAN WG1 #109-e, R1-2205046, 3rd Generation Partnership Project, Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, 19 Pages, XP052191708, XP052203895, 5.1 OTA DPD, Figure 10, paragraph [0002], Chapters 1, 2, Paragraph [06.2], Figure 19.

* cited by examiner

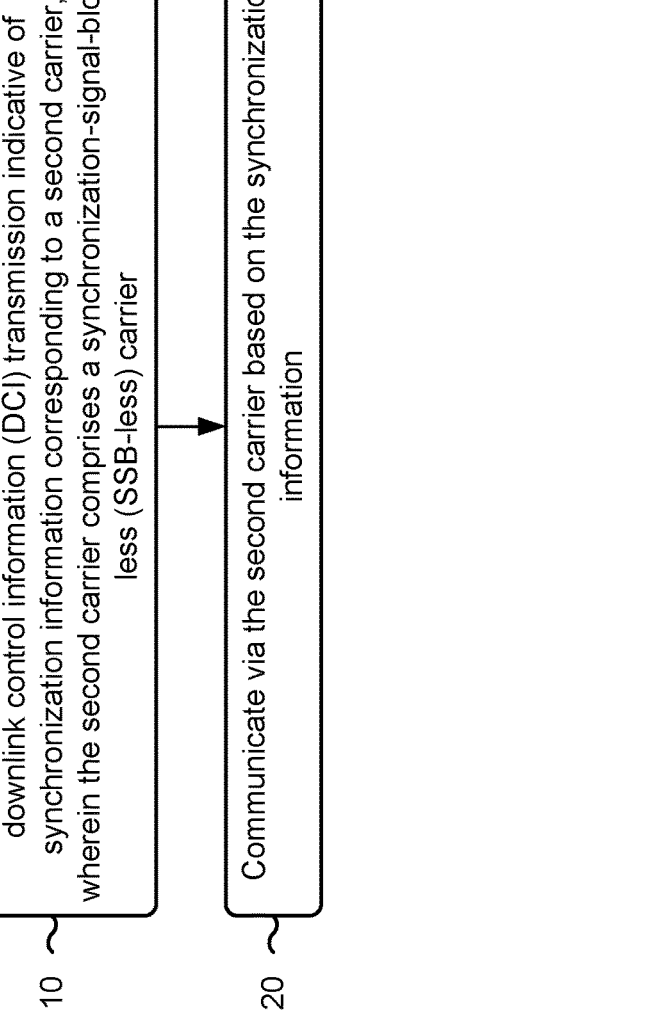

Receive, from a network node associated with a first carrier, a downlink control information (DCI) transmission indicative of synchronization information corresponding to a second carrier, wherein the second carrier comprises a synchronization-signal-block-less (SSB-less) carrier

810

Communicate via the second carrier based on the synchronization information

Determine synchronization information corresponding to a second carrier, wherein the second carrier comprises a synchronization-signal-block-less (SSB-less) carrier Transmit, via the first carrier and to a user equipment (UE), a downlink control information (DCI) transmission indicative of the synchronization information

910

920

900

USER EQUIPMENT SYNCHRONIZATION WITH A SYNCHRONIZATION-SIGNAL-BLOCK-LESS CARRIER

CROSS-REFERENCE TO RELATED APPLICATION

This patent application claims priority to U.S. Provisional Patent Application No. 63/373,263, filed on Aug. 23, 2022, entitled "USER EQUIPMENT SYNCHRONIZATION WITH A SYNCHRONIZATION-SIGNAL-BLOCK-LESS CARRIER," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for user equipment synchronization with a synchronization-signal-block-less carrier.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include one or more memories and one or more processors coupled to the one or more memories. The one or more processors may be configured to cause the UE to receive, from a network node associated with a first carrier, a downlink control information (DCI) transmission indicative of synchronization information corresponding to a second carrier, wherein the second carrier comprises a synchronization-signal-block-less (SSB-less) carrier. The one or more processors may be configured to cause the UE to communicate via the second carrier based on the synchronization information.

Some aspects described herein relate to a network node for wireless communication. The network node may include one or more memories and one or more processors coupled to the one or more memories. The one or more processors may be configured to cause the network node to determine synchronization information corresponding to a second carrier, wherein the second carrier comprises an SSB-less carrier. The one or more processors may be configured to cause the network node to transmit, via the first carrier and to a UE, a DCI transmission indicative of the synchronization information.

Some aspects described herein relate to a method of wireless communication performed by a UE. The method may include receiving, from a network node associated with a first carrier, a DCI transmission indicative of synchronization information corresponding to a second carrier, wherein the second carrier comprises an SSB-less carrier. The method may include communicating via the second carrier based on the synchronization information.

Some aspects described herein relate to a method of wireless communication performed by a network node associated with a first carrier. The method may include determining synchronization information corresponding to a second carrier, wherein the second carrier comprises an SSB-less carrier. The method may include transmitting, via the first carrier and to a UE, a DCI transmission indicative of the synchronization information.

Some aspects described herein relate to a non-transitory computer-readable medium that stores a set of instructions for wireless communication by a UE. The set of instructions, when executed by one or more processors of the UE, may cause the UE to receive, from a network node associated with a first carrier, a DCI transmission indicative of synchronization information corresponding to a second carrier, wherein the second carrier comprises an SSB-less carrier. The set of instructions, when executed by one or more processors of the UE, may cause the UE to communicate via the second carrier based on the synchronization information.

Some aspects described herein relate to a non-transitory computer-readable medium that stores a set of instructions for wireless communication by a network node. The set of instructions, when executed by one or more processors of the network node, may cause the network node to determine synchronization information corresponding to a second carrier, wherein the second carrier comprises an SSB-less carrier. The set of instructions, when executed by one or more processors of the network node, may cause the network node to transmit, via the first carrier and to a UE, a DCI transmission indicative of the synchronization information.

Some aspects described herein relate to an apparatus for wireless communication. The apparatus may include means for receiving, from a network node associated with a first carrier, a DCI transmission indicative of synchronization information corresponding to a second carrier, wherein the second carrier comprises an SSB-less carrier. The apparatus may include means for communicating via the second carrier based on the synchronization information.

Some aspects described herein relate to an apparatus for wireless communication. The apparatus may include means for determining synchronization information corresponding to a second carrier, wherein the second carrier comprises an SSB-less carrier. The apparatus may include means for transmitting, via the first carrier and to a UE, a DCI transmission indicative of the synchronization information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
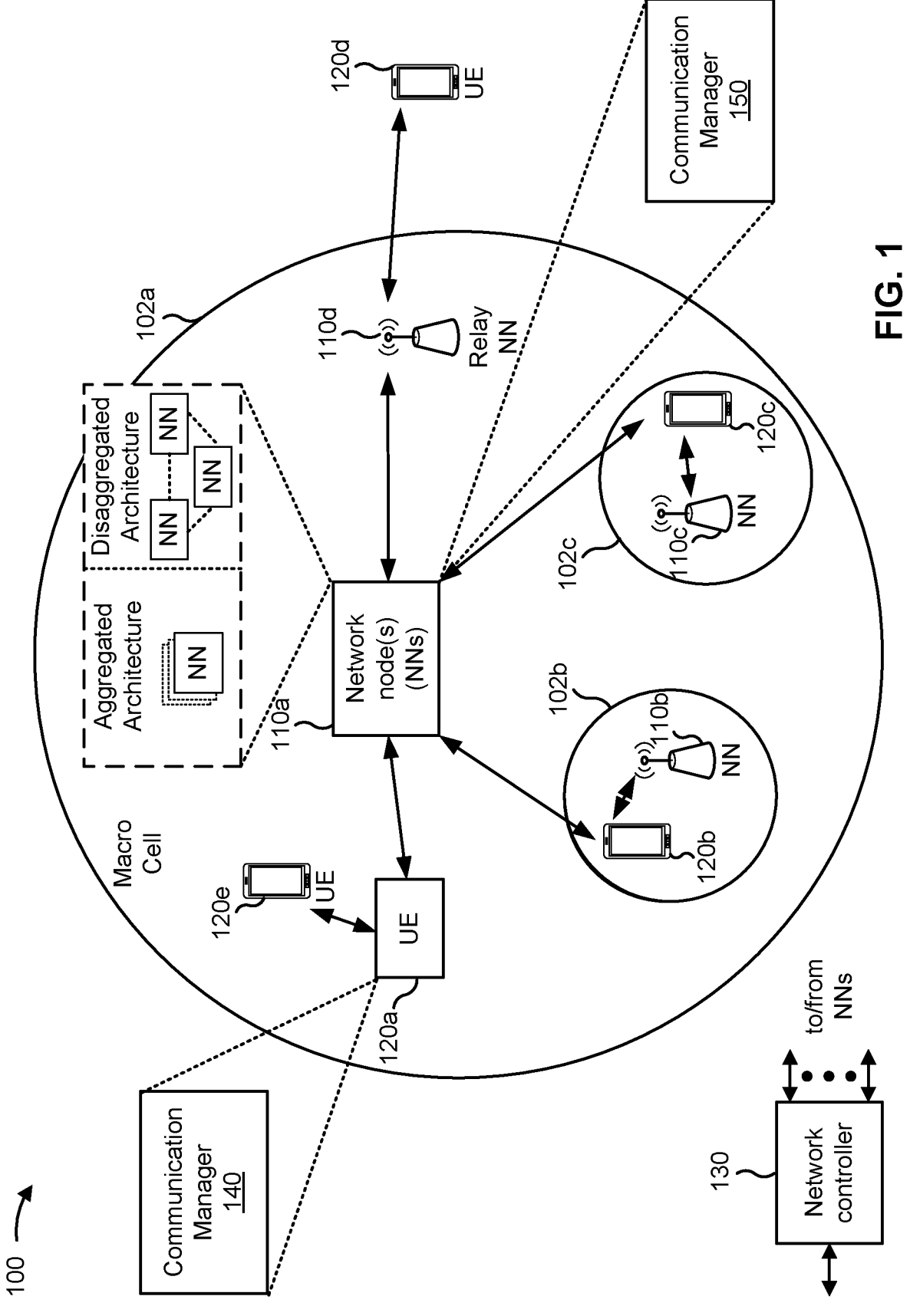
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node associated with a first carrier, a downlink control information (DCI) transmission indicative of synchronization information corresponding to a second carrier, wherein the second carrier comprises an synchronization signal block-less (SSB-less) carrier, and communicate via the second carrier based on the synchronization information. Additionally, or alternatively, the communication manager 140 may perform one or more other operations described herein.

In some aspects, the network node may include a communication manager 150. As described in more detail elsewhere herein, the communication manager 150 may determine synchronization information corresponding to a second carrier, wherein the second carrier comprises an SSB-less carrier; and transmit, via the first carrier and to a UE, a DCI transmission indicative of the synchronization information. Additionally, or alternatively, the communication manager 150 may perform one or more other operations described herein.

As indicated above, FIG. 1 is provided as an example. Other examples may differ from what is described with regard to FIG. 1.

Figure 2:
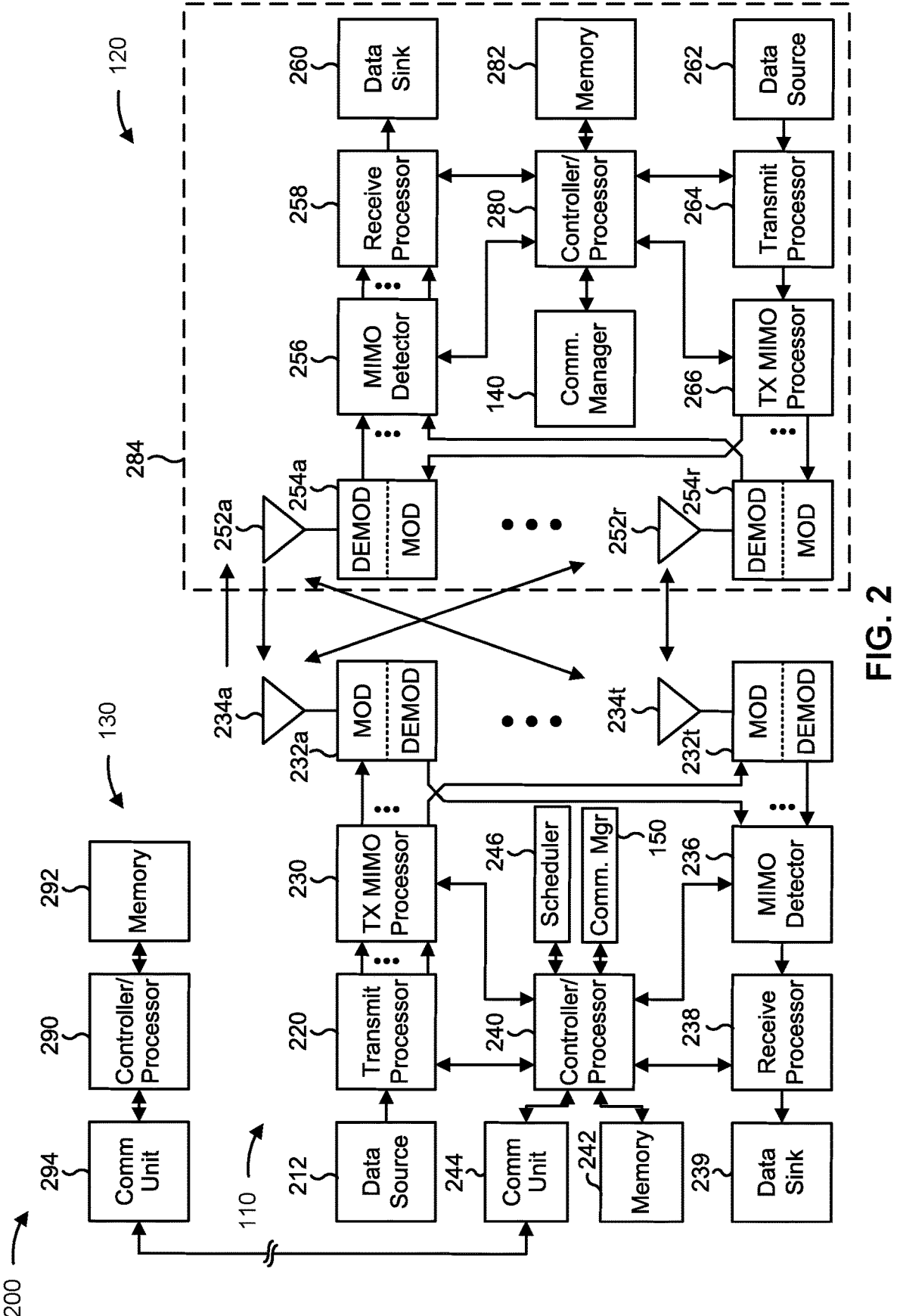
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with UE synchronization with an SSB-less carrier, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network node associated with a first carrier, a DCI transmission indicative of synchronization information corresponding to a second carrier, wherein the second carrier comprises an SSB-less carrier; and/or means for communicating via the second carrier based on the synchronization information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for determining synchronization information corresponding to a second carrier, wherein the second carrier comprises an SSB-less carrier; and/or means for transmitting, via the first carrier and to a UE, a DCI transmission indicative of the synchronization information. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
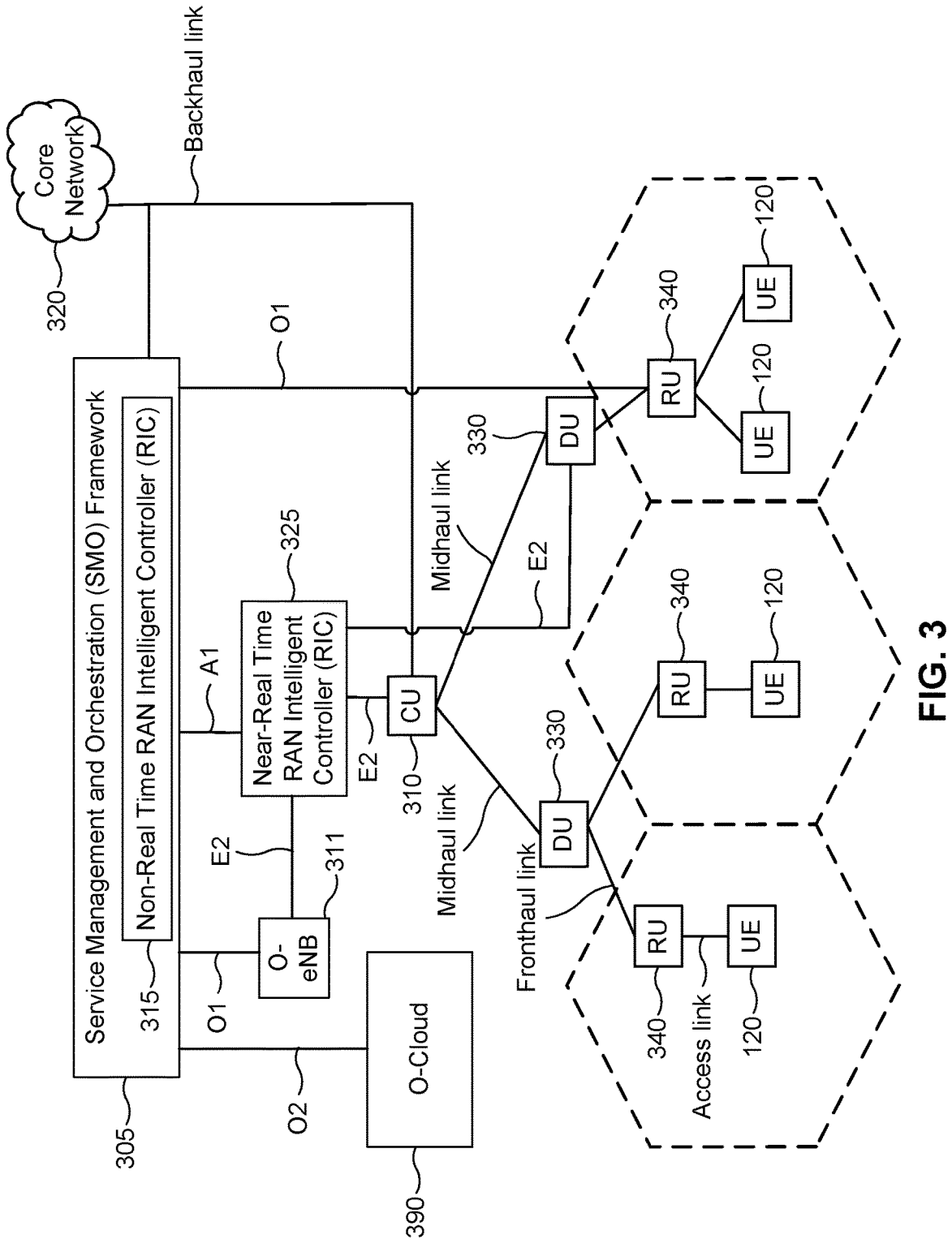
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
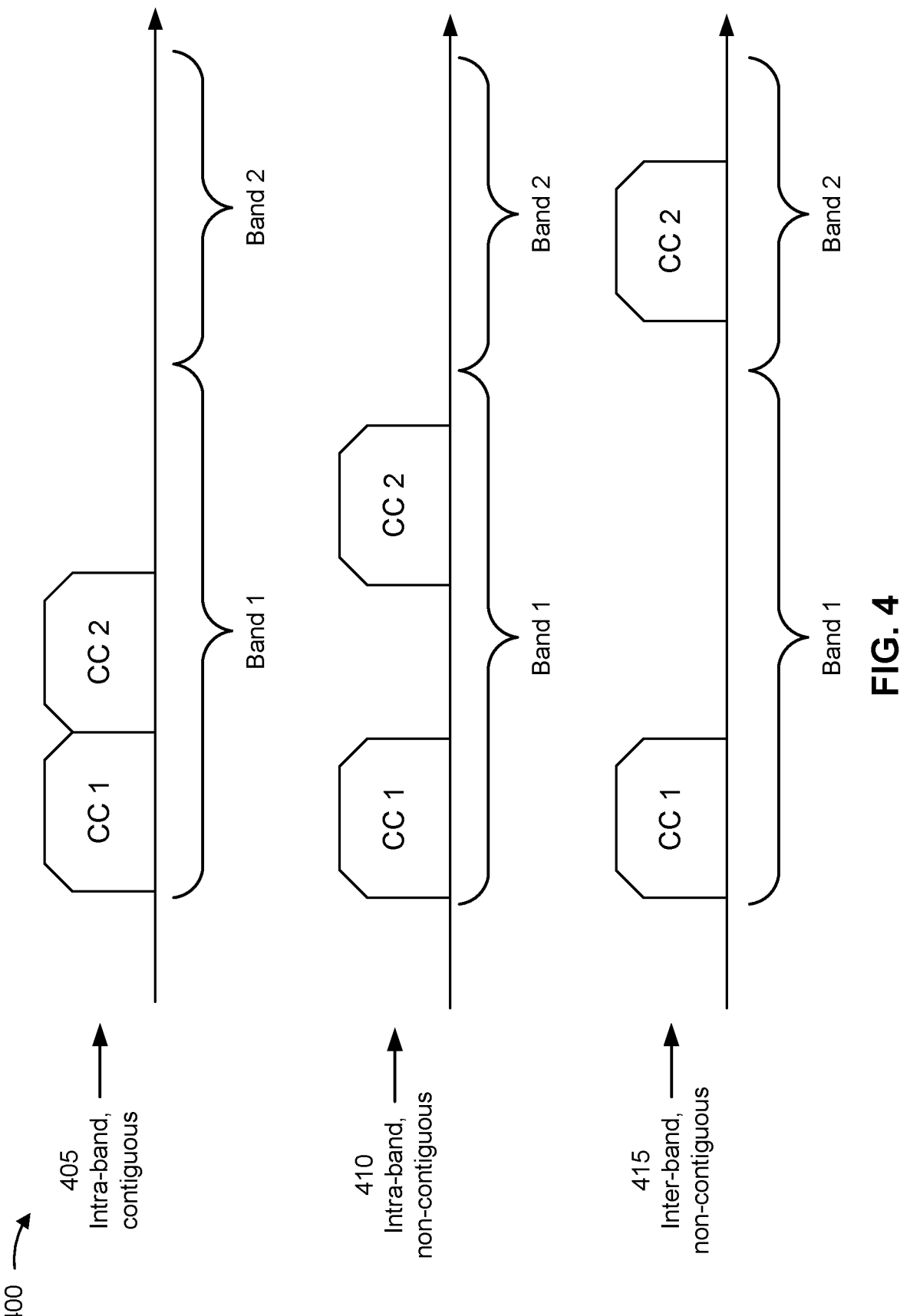
FIG. 4 is a diagram illustrating examples of carrier aggregation, in accordance with the present disclosure.

FIG. 4 is a diagram illustrating examples 400 of carrier aggregation, in accordance with the present disclosure. Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in an RRC message, DCI, and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (Pcell) and one or more secondary carriers or secondary cells (Scells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Figure 5:
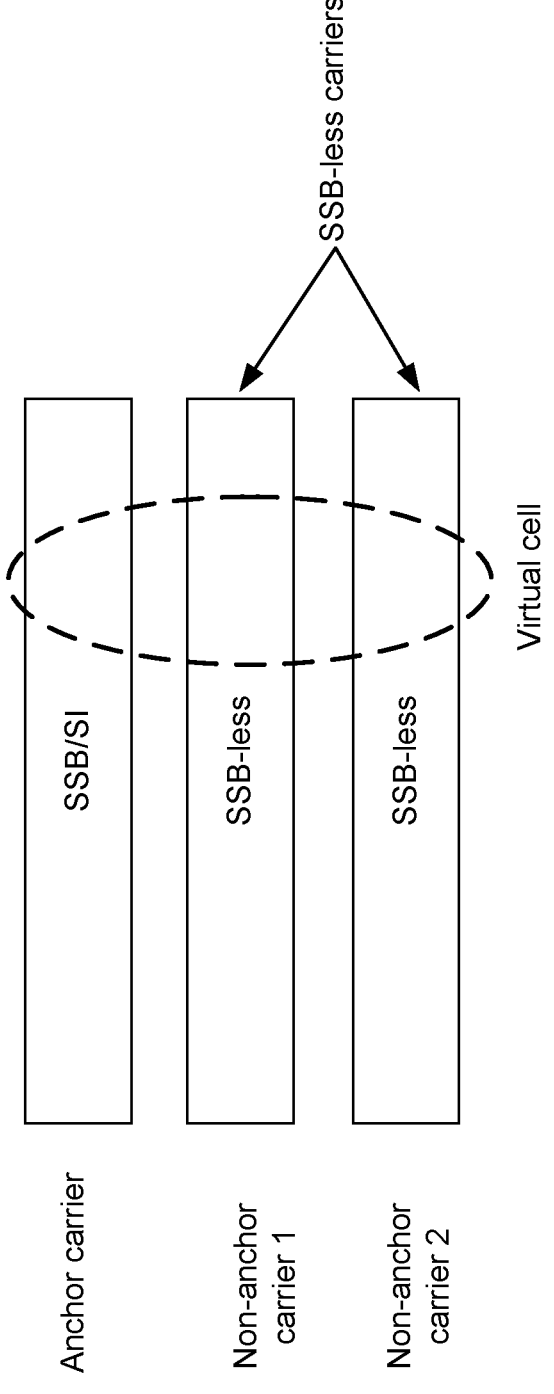
FIG. 5 is a diagram illustrating an example of inter-band carrier aggregation with synchronization-signal-block-less (SSB-less) carriers, in accordance with the present disclosure.

FIG. 5 is a diagram illustrating an example 500 of inter-band carrier aggregation with SSB-less carriers, in accordance with the present disclosure.

In some cases, inter-band carrier aggregation (e.g., carrier aggregation with carriers in different frequency bands) may be configured for a UE (e.g., UE 120) with a carrier that transmits SSBs and one or more SSB-less carriers. An SSB-less carrier is a carrier, in a set of aggregate carriers, that does not transmit SSBs. For example, a network node (e.g., network node 110) may not transmit any broadcast transmissions (e.g., SSBs, system information (SI), and/or paging messages) on an SSB-less carrier. As shown in FIG. 5, in example 500, a set of aggregated carriers for inter-band carrier aggregation includes an anchor carrier, on which SSBs are transmitted, and two SSB-less carriers (e.g., non-anchor carrier 1 and non-anchor carrier 2). For example, the anchor carrier may be the Pcell and the anchor carriers may be Scells. In some cases, the set of aggregated carriers may form a virtual cell for communications with a UE. For example, the set of aggregated carriers may be associated with a virtual cell identifier.

The network node may transmit SSBs and SI on the anchor carrier, but not on the non-anchor carriers (e.g., the SSB-less carriers). The SSBs and SI transmitted on the anchor carrier may provide time and frequency synchronization information and SI for the other carriers (e.g., the non-anchor carriers), as well as for the anchor carrier. In some cases, transmitting SSBs on the anchor carrier (e.g., the Pcell), but not on the non-anchor carriers (e.g., the Scells) may improve Scell activation latency (e.g., because the UE does not receive a respective SSB on each Scell). Such improved Scell activation latency may facilitate efficient Scell activation and/or deactivation in accordance with the actual traffic associated with a UE, which may result in network power savings. Furthermore, not transmitting SSBs on the non-anchor carriers (e.g., the Scells) may result in improved resource utilization by reducing downlink overhead. This may allow for deeper network sleep for improved power savings.

In some examples, a transmission of a reference signal or a channel in a frequency band or carrier may have a quasi co-location (QCL) source directly or indirectly associated with an SSB transmitted in the band or carrier. However, an SSB-less carrier may carry no broadcast transmissions (e.g., SSBs, SI, and/or paging messages), and possibly no tracking reference signal (TRS), for network power savings. For example, an SSB-less carrier may carry only control channels and data channels.

As indicated above, FIG. 5 is provided as an example. Other examples may differ from what is described with respect to FIG. 5.

Figure 6:
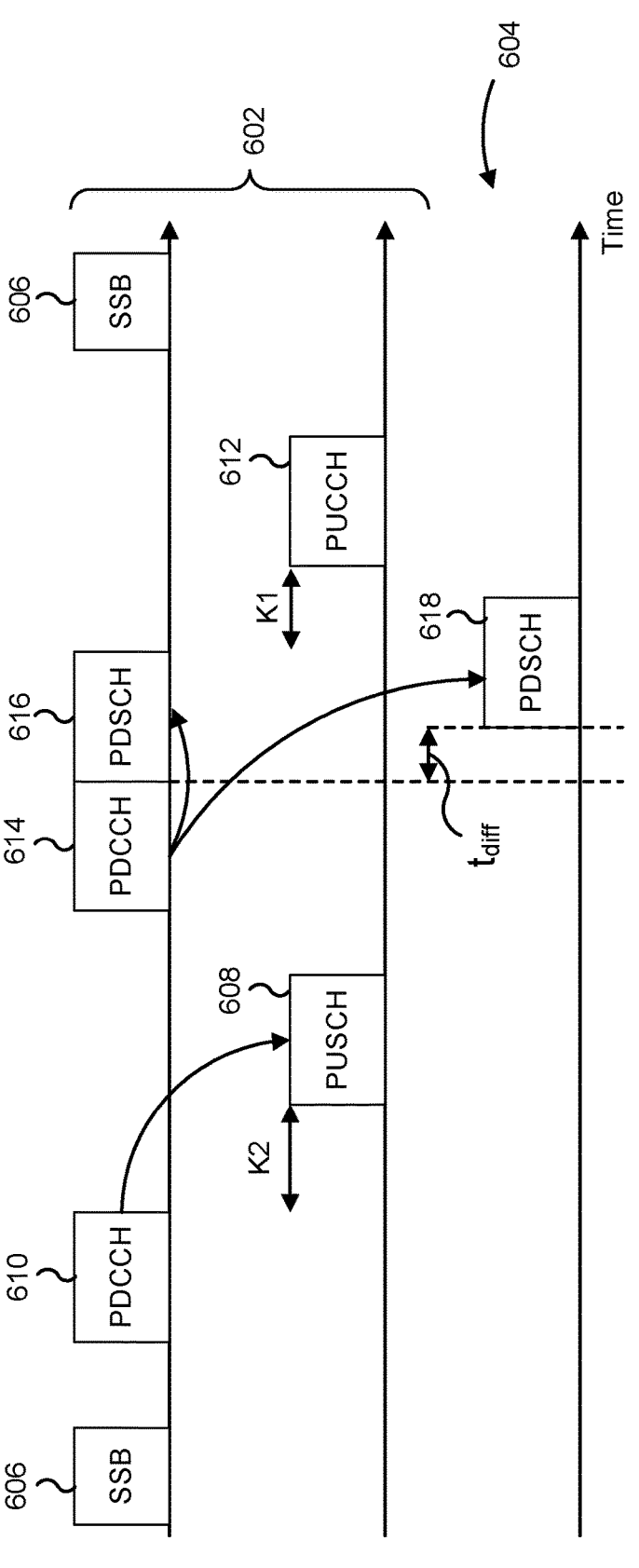
FIG. 6 is a diagram illustrating an example of inter-band carrier aggregation with SSB-less carriers, in accordance with the present disclosure.

FIG. 6 is a diagram illustrating an example 600 of inter-band carrier aggregation with SSB-less carriers, in accordance with the present disclosure.

Example 600 includes an anchor carrier 602 and a non-anchor carrier 604. The non-anchor carrier 604 may be an SSB-less carrier, which may be established as an SCell. As shown, a periodic SSB 606 may be transmitted on the anchor carrier 602, which may facilitate providing a UE with timing offset values (shown as "K2" and "K1"), which may be used, for example, to determine the start of physical uplink shared channel (PUSCH) occasions 608 scheduled by a DCI transmission corresponding to a physical downlink control channel (PDCCH) occasion 610. Similarly, a timing offset (K1) may be used to determine an offset associated with a physical uplink control channel (PUCCH) occasion 612. In this way, the SSBs 606 may be used to facilitate synchronization of the UE with the anchor carrier 602.

As shown, a PDCCH occasion 614 may be used to transmit DCI scheduling a physical downlink shared channel (PDSCH) 616 occasion in the anchor carrier 602. The PDCCH occasion 614 also may be used to transmit DCI scheduling a PDSCH occasion 618 in the non-anchor carrier 604. In some cases, the same DCI may be used to schedule the PDSCH 616 occasion and the PDSCH 618 occasion. In some cases (for example, where the non-anchor carrier 604 is an uplink-only carrier), the PDCCH occasion 614 may be used to transmit DCI scheduling a PUSCH occasion in the non-anchor carrier 604. However, in carrier aggregation involving a non-anchor carrier (e.g., an SSB-less carrier), SSBs are not transmitted in the non-anchor carrier 604. Similarly, tracking reference signals (TRSs) may not be transmitted in the non-anchor carrier 604. Thus, the UE may be unaware of a time difference, $t_{diff}$, between a transmission associated with the PDSCH occasion 618 and a reception associated with the PDSCH occasion 618. As a result, the UE can be unsynchronized with the non-anchor carrier, which may lead to missed receptions, thus increasing latency and communication overhead (e.g., due to re-transmissions).

Some aspects of the techniques and apparatuses described herein may facilitate UE synchronization with a non-anchor carrier. For example, in some aspects, a network node may make use of cross-carrier scheduling and, in a DCI (e.g., a DCI format 1_1) may perform cross-carrier allocation, thereby informing the UE about an expected reception time, $t_{SSB-less}^{Rx}$ of a PDSCH transmission in the "SSB-less" carrier. In some aspects, a margin value may also be added to the expected reception time. Alternatively, if the UE is configured with an aperiodic-TRS (A-TRS), just before having acquired synchronization in the SSB-less carrier, the UE may compute the difference in propagation delay measured from A-TRS measurements.

For example, in some aspects, a UE may receive, from a network node associated with a first carrier, a DCI transmission indicative of synchronization information corresponding to a second carrier, where the second carrier is a non-anchor carrier. The UE may communicate via the second carrier based on the synchronization information. As a result, some aspects, may facilitate applying SSB-less carriers in any frequency band, thereby facilitate energy savings from refraining from transmitting SSBs in the non-anchor carrier. In some aspects, UE synchronization may be achieved more rapidly via cross-carrier scheduling than via SSB acquisition. Thus, some aspects, may positively impact network performance.

As indicated above, FIG. 6 is provided as an example. Other examples may differ from what is described with respect to FIG. 6.

Figure 7:
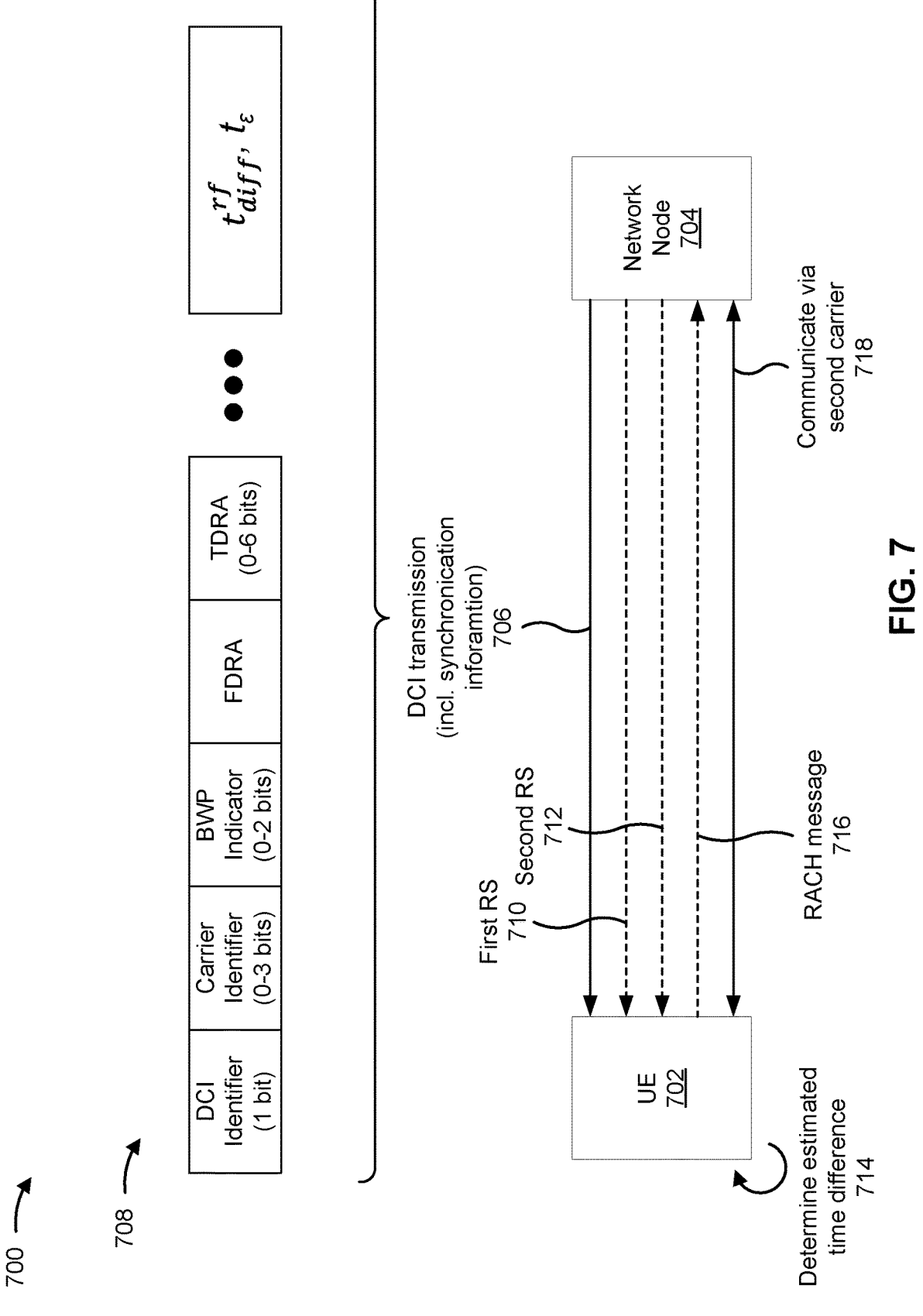
FIG. 7 is a diagram illustrating an example of UE synchronization with an SSB-less carrier, in accordance with the present disclosure.

FIG. 7 is a diagram illustrating an example 700 of UE synchronization with an SSB-less carrier, in accordance with the present disclosure. As shown in FIG. 7, a UE 702 and a network node 704 may communicate with one another. In some aspects, the UE 702 and the network node 704 may be included in a wireless network, such as wireless network 100. In some aspects, the UE 702 may be, be similar to, include, or be included in, the UE 120 depicted in FIGS. 1-3. In some aspects, the network node 704 may be, be similar to, include, or be included in, the network node 110 depicted in FIGS. 1 and 2, and/or one or more components of the disaggregated base station architecture 300 depicted in FIG. 3.

In some aspects, inter-band carrier aggregation may be configured for the UE 702. For example, the network node 704 may configure inter-band carrier aggregation for the UE 702 via an RRC message, DCI, a medium access control control element (MAC CE), and/or another signaling message transmitted from the network node 704 to the UE 702. In this case, a set of aggregated carriers configured for the UE 702 may include a plurality of carriers in different frequency bands. The plurality of carriers may include at least one carrier that transmits SSBs (e.g., one or more SSBs are transmitted on the carrier by the network node 704) and one or more SSB-less carriers. In some aspects, the at least one carrier that transmits SSBs may include a Pcell and/or an anchor carrier. In some aspects, the one or more SSB-less carriers may include one or more Scells and/or non-anchor carriers. In some aspects, the one or more SSB-less carriers may include an uplink-only carrier.

As shown by reference number 706, the network node 704 may transmit, and the UE 702 may receive, a DCI transmission. The DCI transmission may be associated with a first carrier (e.g., an anchor carrier) and may be indicative of synchronization information corresponding to a second carrier. The second carrier may be an SSB-less carrier. In some aspects, the DCI transmission may include a carrier indication field indicative of the second carrier.

In some aspects, the synchronization information may be configured to facilitate determination of a time window to be monitored, by the UE 702, for a PDSCH associated with the second carrier. For example, the UE 702 may be configured to monitor a PDSCH during the time window. In some aspects, the time window may be based on a first expected reception time, $$t^{Rx}_{anchor\_carrier},$$

corresponding to a first PDSCH associated with the first carrier and/or a margin value, $t_\varepsilon$. In some aspects, the time window may be further based on an unsynchronized time difference value, $$t^{rf}_{diff},$$

or a maximum unsynchronized time difference value, $$\text{Max}(t^{rf}_{diff}).$$

In some aspects, the synchronization information may indicate at least one of the margin value or the unsynchronized time difference value. In some aspects, the first expected reception time may include a timing advance (TA) value associated with the first carrier. For example, the network node 704 may transmit, and the UE 702 may receive, a TA indication that indicates the TA value. In some aspects, the TA value may be transmitted using a MAC CE.

As shown, the DCI transmission 708 may include a number of components including a DCI identifier (1 bit), a carrier identifier (0-3 bits), a bandwidth part (BWP) indicator (0-2 bits), a frequency domain resource allocation (FDRA), a time domain resource allocation (TDRA) (0-6 bits), and/or an indication of synchronization information such as, for example, $$t^{rf}_{diff},$$

and $t_\varepsilon$. Any number of other components may be included in the DCI transmission 708. If the network node 704 is not aware of the $$t^{rf}_{diff},$$

the DCI transmission may exclude the parameter $$t^{rf}_{diff}.$$

In some aspects, the margin value $t_\varepsilon$ can be encoded in 5-9 bits. In some aspects, the margin value $t_\varepsilon$ may be transmitted via MAC CE together with TA information on the second SSB-less carrier.

In some aspects, the time window may be determined using any of a number of operations. For example, a first operation (Operation 1) may be used in a scenario in which the radio frequency (RF) components of the first carrier and the second carrier are not synchronized and are associated with different RF bands. In that case, for example, due to the non-synchronization, there may be no time difference $$t^{rf}_{diff}$$

to be reported to the UE 702.

In Operation 1, an uplink propagation delay in the anchor carrier, T_uplinkPropagation$_{anchor\_carrier}$, may be known at the network node 704. In some aspects, the uplink propagation delay may correspond to a TA value. A downlink propagation delay in the anchor carrier, T_downlinkPropagation$_{anchor\_carrier}$, may be equal to the expected reception time for PDSCH in the anchor carrier, $$t^{Rx}_{anchor\_carrier},$$

where the anchor carrier includes uplink/downlink reciprocity. In some aspects of Operation 1, the first expected reception time $$t^{Rx}_{anchor\_carrier}$$

may include a time difference between a first time and a second time, where the first time corresponds to a time of transmission of a first bit of a first PDSCH communication associated with the first PDSCH, and where the second time corresponds to a time of reception of the first bit of a first PDSCH communication associated with the first PDSCH. For example, the expected reception time for PDSCH in the anchor carrier, $$t^{Rx}_{anchor\_carrier},$$

may be the time difference between the instant to, which is the instant of PDSCH transmission (e.g., of the first PDSCH bit transmission) and the instant $t_1$, of reception of PDSCH (e.g., of the first PDSCH bit):

$$t^{Rx}_{anchor\_carrier} = |t_1 - t_0|.$$

In Operation 1, the expected reception time for PDSCH in the anchor carrier, $$t^{Rx}_{anchor\_carrier},$$

may be the starting point for estimating the expected reception in the SSB-less carrier, $$t^{Rx}_{SSB-less}.$$

A margin value $t_\varepsilon$ accounting for different multipath profiles may be added, so that the UE 702 expects the PDSCH transmission, and thus PDSCH reception, at the "SSB-less" carrier within the time window:

$$\left[ t^{Rx}_{anchor\_carrier} - t_\varepsilon, t^{Rx}_{anchor\_carrier} + t_\varepsilon \right].$$

In some aspects, the value of $t_\varepsilon$ may be signaled to the UE via DCI when cross-carrier scheduling takes place, together with a carrier indicator DCI field. Thus, in Operation 1, the UE 702 may monitor PDSCH within a time window $[-t_\varepsilon, t_\varepsilon]$.

In some aspects, Operation 1 may not include any computation by the UE in determining the window to be monitored. In some aspects, a MAC CE may be used to transmit the margin value $t_\varepsilon$. In some aspects, acquisition time may be reduced by transmitting the margin value in Layer 1 signalling. In some aspects, the margin value may include a UE-specific margin value. For example, in some aspects, the UE-specific margin value may be based on at least one of a cell size, an estimated distance between the UE 702 and the network node 704 (e.g., measured via reference signal received power (RSRP), channel state information reference signal (CSI-RS) measurements, and/or positioning reference signal (PRS) measurements, among other examples), and/or a cyclic prefix (CP) length, among other examples. In some aspects, the margin value may be less than or equal to a quotient of a division of a CP associated with the second carrier by a constant. For example, the upper bound for the margin value $t_\varepsilon$ may be $t_{cyclic\_prefix}/N$ (e.g., wherein N>3). For example, for a subcarrier spacing (SCS) of 120 kHz and normal CP of 0.59 μsec, the margin value may be bound by 0.59/3=0.1967 ρsec which is equal to ~386 Tc (NR basic time unit). Thus, the margin value may be encoded using 10 bits.

In some aspects, the margin value may include a frequency drift value. For example, in some aspects, the network node 704 may transmit, and the UE 702 may receive (e.g., via the DCI transmission 708) an indication of a range of potential frequency drift values. The synchronization information may include the indication of the range of potential frequency drift values. For example, in addition to the acquisition in time, acquisition in frequency may be used by the UE 702 to synchronize with the SSB-less carrier. In Operation 1, the value $t_\varepsilon$ may be associated with a value for a drift in frequency, $\Delta f_\varepsilon$. The network node 704 may include an estimate, from prior observations, the drift in frequency $\Delta f$ that is statistically associated with a drift in time, $\Delta t$, and considering the range of $t_\varepsilon$ values, a range of $\Delta f$ values may be reported to the UE 702. In some aspects, the UE 702 may be configured to monitor each of the potential frequency drift values in the range of potential frequency drift values. For example, the UE 702 may store the received signal (e.g., from the expected PDSCH) and may probe all frequencies within the frequency window $[-\Delta f, -\Delta f]$.

A modification of Operation 1 (Operation 1A) may be used in a scenario in which an unsynchronized time difference, $$t^{rf}_{diff},$$

due to non-synchronized RF clocks in different RF bands may be known to the network node 704. Operation 1A may be similar to Operation 1, but in the case of Operation 1A, there is a time difference due to RF parts of the different carriers not being synchronized (or drifting apart).

In Operation 1A, the time difference of reception at different carriers, $t_{diff}$, may be the sum of the time difference due to RF clocks of the different carriers drifting away, $$t^{rf}_{diff},$$

and due to propagation delay difference, $$t_\varepsilon, t_{diff} = t^{rf}_{diff} + t_\varepsilon.$$

A margin value $t_\varepsilon$, may be added, so that the UE 702 expects the PDSCH transmission, and thus the PDSCH reception at the SSB-less carrier, within the time window:

$$\left[ t^{Rx}_{anchor\_carrier} + t^{rf}_{diff} - t_\varepsilon, t^{Rx}_{anchor\_carrier} + t^{rf}_{diff} + t_\varepsilon \right].$$

The values of $$t_{diff}^{rf}$$

and $t_\varepsilon$ may be signaled to the UE 702 via DCI when cross-carrier scheduling takes place, together with the carrier indicator DCI field, for example, if $$t_{diff}^{rf}$$

is available at the network node 704 and its estimation is determined to be accurate. In some cases, the value of $$t_{diff}^{rf}$$

may be signaled in a semi-static manner, such as via RRC signalling or MAC CE signalling. Accordingly, in operation 1A, the UE 702 may monitor PDSCH within a time window $$\left[ t_{diff}^{rf} - t_\varepsilon, t_{diff}^{rf} + t_\varepsilon \right].$$

An operation 1B may be similar to operation 1A, but may be used in a scenario in which an unsynchronized time difference, $$t_{diff}^{rf},$$

due to non-synchronized RF in different RF bands is not known to the network node 704. In operation 1B, the UE 702 may parse across the whole set of values between 0 and a maximum value of $$t_{diff}^{rf}, \mathrm{Max}\!\left(t_{diff}^{rf}\right).$$

A margin value $t_\varepsilon$, may be added, so that the UE 702 expects the PDSCH transmission, and thus the PDSCH reception at the SSB-less carrier within the time window:

$$\left[ t_{anchor\_carrier}^{Rx} - \mathrm{Max}\!\left(t_{diff}^{rf}\right)t_\varepsilon, t_{anchor\_carrier}^{Rx} + \mathrm{Max}\!\left(t_{diff}^{rf}\right) + t_\varepsilon \right].$$

The margin value $t_\varepsilon$ may be signaled to the UE 702 via DCI when cross-carrier scheduling takes place, together with the carrier indicator DCI field, if $$t_{diff}^{rf}$$

is not available at the network node 704 but the value of $$\left(t_{diff}^{rf}\right)$$

is known to the UE 702, or is reported if not known. Thus, in operation 1B, the UE 702 may monitor PDSCH within a time window $$\left[ -\mathrm{Max}\!\left(t_{diff}^{rf}\right) - t_\varepsilon, \mathrm{Max}\!\left(t_{diff}^{rf}\right) + t_\varepsilon \right].$$

In some aspects, operation 1 may be extended by providing the UE 702 with a mapping between measured RSRP and $t_\varepsilon$ range or between a TA value sent by the network and $t_\varepsilon$ range. Thus, there may be no need for the network node 704 to transmit anything in case of cross-carrier scheduling. The mapping may be generated by the network node 704 based on statistics collected from the UE 702.

In some aspects, a second operation (operation 2) may be used in a scenario in which the SSB-less carrier does not have a periodic TRS (e.g., the network node 704 does not periodically transmit a TRS). In some aspects, in operation 2, the time window may be based on an estimated time difference between a first expected reception time corresponding to a first PDSCH associated with the first carrier and a second expected reception time corresponding to a second PDSCH associated with the second carrier. The first expected reception time may include a TA value associated with the first carrier. In some aspects, the estimated time difference may be determined by the UE 702 based on reference signal reception.

As shown by reference number 710, the network node 704 may transmit, and the UE 702 may receive, a first reference signal associated with the first carrier. As shown by reference number 712, the network node 704 may transmit, and the UE 702 may receive, a second reference signal associated with the second carrier. As shown by reference number 714, the UE 702 may determine the estimated time difference between the first expected reception time and the second expected reception time based on the first reference signal and the second reference signal.

In some aspects, at least one of the first reference signal or the second reference signal may include a TRS. The may include an A-TRS. The A-TRS may include a nonzero-power channel state information reference signal (NZP-CSI-RS) associated with an active TRS information value. In some aspects, the first reference signal may include a first A-TRS and the second reference signal may include a second A-TRS. A first set of transmission parameters may be associated with the first A-TRS and a second set of transmission parameters may be associated with the second A-TRS. The second set of transmission parameters may correspond to the first set of transmission parameters. The first set of transmission parameters may indicate at least one of a bandwidth associated with the first A-TRS, a period associated with the first A-TRS, or a resource block (RB) location associated with the first A-TRS.

In contrast with operation 1, operation 2 may facilitate a shorter range of values of the margin value $t_\varepsilon$. For example, if a cell has a radius equal to 100 meters (m), the system may desire to tolerate a difference in the multipath in the order of 75 m. Thus, a difference in the multipath in the order of 250 nanoseconds (ns) may be considered. If the value of $t_\varepsilon$ is coded in terms of the basic time unit, Tc, which is equal to 0.509 ns, then, there may be 200/0.509≈492 different values, and 9 bits will be used in the DCI transmission 708 for the encoding of $t_\varepsilon$. If the UE 702 computed an estimated $t_{diff}$ of ~10 m, then 33 ns of time difference, which can be encoded in 33/0.509≈64 different values, can be tolerated, and the value of $t_\varepsilon$ may be encoded in 6 bits.

In some aspects, operation 2 may be similar to operation 1, with the difference that the network node 704, just before scheduling PDSCH onto the SSB-less carrier to the UE 702, may schedule aperiodic NZP-CSI-RS with the TRS information value activated, #K slots prior to the PDSCH transmission (in the absence of periodic TRS). This aperiodic NZP-CSI-RS with the TRS information value activated scheduling can be transmitted in the anchor carrier in some aspects. The UE 702 may have the option to obtain the estimate of $t_{diff}$ while trying to obtain synchronization onto the SSB-less carrier. In some aspects, in operation 2, A-TRS transmission in the SSB-less carrier may be performed with the same bandwidth, period, and respective RB location as in the anchor carrier.

A third operation (operation 3) may be used based on a random access channel (RACH) procedure. For example, as shown by reference number 716, the UE 702 may transmit, and the network node 704 may receive, a RACH message during the time window. The time window may be based on a first TA estimate associated with the second carrier. The first TA estimate associated with the second carrier may be based on a TA value associated with the first carrier. In some aspects, the first TA estimate associated with the second carrier may be equal to the TA value associated with the first carrier. In some aspects, the first TA estimate associated with the second carrier may be equal to a sum of the TA value and a TA margin value. The TA margin value may be based on at least one of a cell size or a distance between the UE and a network node associated with a TA group corresponding to the second carrier. In some aspects, the synchronization information may indicate at least one of a RACH parameter associated with the second carrier and the TA margin value. In some aspects, a MAC CE may indicate the at least one of the RACH parameter associated with the second carrier and the TA margin value.

For example, in operation 3, the network node 704 may indicate, in the DCI transmission 708, that the UE 702 is to transmit RACH from the SSB-less carrier. The network node 704 may indicate the RACH signature (e.g., RACH related parameters such as time slot, frequency, and/or Zadoff-Chu parameters). The network node 704 may indicate the TA advance estimate in the SSB less carrier. This estimate can be the same TA value as in the anchor carrier, or it can be the same TA value plus a delta, ΔTA. This value ΔTA may be computed/estimated roughly at the network node 704 in a similar manner to the computation/estimation of $t_\varepsilon$ (e.g., on the basis of cell size, UE 702 distance to a network node belonging to a secondary TA group associated with the SSB-less carrier). The network node 704 may expect the RACH transmission from the UE 702 in the secondary TAG within the time window [−ΔTA, +ΔTA]. A value of ΔTA may be transmitted via DCI performing cross-carrier scheduling or via MAC CE and may be encoded using 5-10 bits. In some aspects, RACH-related parameters may be transmitted to the UE 702 via DCI or via MAC CE (alternatively, the UE can get the RACH parameters via RRC).

In some aspects, operation 3 may be extended by providing the UE 702 with a mapping between measured RSRP and a $t_\varepsilon$ range or between a TA value sent by the network and $t_\varepsilon$ range, in which case there may be no need for the network node 704 to transmit anything in case of cross-carrier scheduling. The mapping is generated by the network node 704 based on statistics collected from the UE 702.

As shown by reference number 718, the UE 702 and the network node 704 may communicate via the second carrier based on the synchronization information. For example, the UE 702 may monitor a second PDSCH during a time window determined in accordance with one of the operations described herein.

As indicated above, FIG. 7 is provided as an example. Other examples may differ from what is described with respect to FIG. 7.

FIG. 8 is a diagram illustrating an example process 800 performed, for example, by a UE, in accordance with the present disclosure. Example process 800 is an example where the UE (e.g., UE 702) performs operations associated with UE synchronization with an SSB-less carrier.

As shown in FIG. 8, in some aspects, process 800 may include receiving, from a network node associated with a first carrier, a DCI transmission indicative of synchronization information corresponding to a second carrier, wherein the second carrier comprises an SSB-less carrier (block 810). For example, the UE (e.g., using communication manager 1008 and/or reception component 1002, depicted in FIG. 10) may receive, from a network node associated with a first carrier, a DCI transmission indicative of synchronization information corresponding to a second carrier, wherein the second carrier comprises an SSB-less carrier, as described above.

As further shown in FIG. 8, in some aspects, process 800 may include communicating via the second carrier based on the synchronization information (block 820). For example, the UE (e.g., using communication manager 1008, reception component 1002, and/or transmission component 1004, depicted in FIG. 10) may communicate via the second carrier based on the synchronization information, as described above.

Process 800 may include additional aspects, such as any single aspect or any combination of aspects described below and/or in connection with one or more other processes described elsewhere herein.

In some aspects, the DCI transmission includes a carrier indication field indicative of the second carrier. In some aspects, communicating via the second carrier based on the synchronization information comprises monitoring a second PDSCH during a time window, wherein the time window is based on a first expected reception time corresponding to a first PDSCH associated with the first carrier and a margin value. In some aspects, the time window is further based on an unsynchronized time difference value or a maximum unsynchronized time difference value. In some aspects, the synchronization information indicates at least one of the margin value or the unsynchronized time difference value.

In some aspects, the first expected reception time comprises a TA value associated with the first carrier. In some aspects, process 800 includes receiving a TA indication that indicates the TA value. In some aspects, receiving the TA indication comprises receiving a MAC CE that includes the TA indication.

In some aspects, the first expected reception time comprises a time difference between a first time and a second time, wherein the first time corresponds to a time of transmission of a first bit of a first PDSCH communication associated with a first PDSCH, and wherein the second time comprises a time of reception of the first bit of the first PDSCH communication. In some aspects, the margin value comprises a UE-specific margin value. In some aspects, the UE-specific margin value is based on at least one of a cell size, an estimated distance between the UE and the network node, or a cyclic prefix length. In some aspects, the margin value is less than or equal to a quotient of a division of a cyclic prefix associated with the second carrier by a constant.

In some aspects, the margin value comprises a frequency drift value. In some aspects, process 800 includes receiving an indication of a range of potential frequency drift values including the frequency drift value. In some aspects, the synchronization information includes the indication of the range of potential frequency drift values. In some aspects, communicating via the second carrier based on the synchronization information comprises monitoring each of the potential frequency drift values in the range of potential frequency drift values.

In some aspects, communicating via the second carrier based on the synchronization information comprises monitoring a second PDSCH during a time window, wherein the time window is based on an estimated time difference between a first expected reception time corresponding to a first PDSCH associated with the first carrier and a second expected reception time corresponding to a second PDSCH associated with the second carrier. In some aspects, the first expected reception time comprises a TA value associated with the first carrier.

In some aspects, process 800 includes receiving a first reference signal associated with the first carrier, receiving a second reference signal associated with the second carrier, and determining the estimated time difference between the first expected reception time and the second expected reception time based on the first reference signal and the second reference signal. In some aspects, at least one of the first reference signal or the second reference signal comprises a TRS. In some aspects, the TRS comprises an aperiodic TRS (A-TRS). In some aspects, the A-TRS comprises a nonzero-power channel state information reference signal (CSI-RS) associated with an active TRS information value. In some aspects, the first reference signal comprises a first A-TRS and the second reference signal comprises a second A-TRS, wherein a first set of transmission parameters is associated with the first A-TRS and a second set of transmission parameters is associated with the second A-TRS, and wherein the second set of transmission parameters corresponds to the first set of transmission parameters. In some aspects, the first set of transmission parameters indicates at least one of a bandwidth associated with the first A-TRS, a period associated with the first A-TRS, or a resource block location associated with the first A-TRS.

In some aspects, communicating via the second carrier based on the synchronization information comprises transmitting a RACH message during a time window, wherein the time window is based on a first TA estimate associated with the second carrier. In some aspects, the first TA estimate associated with the second carrier is based on a TA value associated with the first carrier. In some aspects, the first TA estimate associated with the second carrier is equal to the TA value associated with the first carrier. In some aspects, the first TA estimate associated with the second carrier is equal to a sum of the TA value and a TA margin value. In some aspects, the TA margin value is based on at least one of a cell size or a distance between the UE and a network node associated with a TA group corresponding to the second carrier. In some aspects, the synchronization information indicates at least one of a RACH parameter associated with the second carrier and the TA margin value. In some aspects, process 800 includes receiving a MAC CE that indicates at least one of a RACH parameter associated with the second carrier and the TA margin value.

In some aspects, the second carrier comprises an uplink-only carrier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
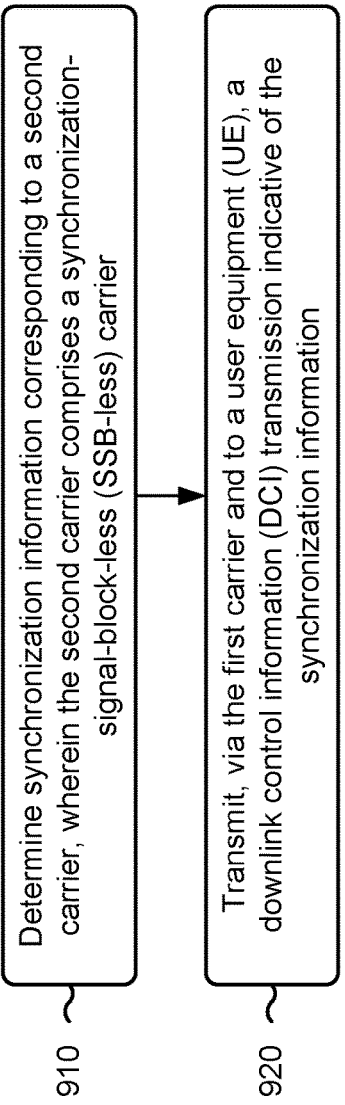
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 704) performs operations associated with UE synchronization with an SSB-less carrier.

As shown in FIG. 9, in some aspects, process 900 may include determining synchronization information corresponding to a second carrier, wherein the second carrier comprises an SSB-less carrier (block 910). For example, the network node (e.g., using communication manager 1108 and/or determination component 1110, depicted in FIG. 11) may determine synchronization information corresponding to a second carrier, wherein the second carrier comprises an SSB-less carrier, as described above.

As further shown in FIG. 9, in some aspects, process 900 may include transmitting, via the first carrier and to a UE, a DCI transmission indicative of the synchronization information (block 920). For example, the network node (e.g., using communication manager 1108 and/or transmission component 1104, depicted in FIG. 11) may transmit, via the first carrier and to a UE, a DCI transmission indicative of the synchronization information, as described above.

Process 900 may include additional aspects, such as any single aspect or any combination of aspects described below and/or in connection with one or more other processes described elsewhere herein.

In some aspects, the DCI transmission includes a carrier indication field indicative of the second carrier. In some aspects, a time window for monitoring, based on the synchronization information, a second PDSCH associated with the second carrier, is based on a first expected reception time corresponding to a first PDSCH associated with the first carrier and a margin value. In some aspects, the time window is further based on an unsynchronized time difference value or a maximum unsynchronized time difference value. In some aspects, the synchronization information indicates at least one of the margin value or the unsynchronized time difference value. In some aspects, the first expected reception time comprises a TA value associated with the first carrier. In some aspects, process 900 includes transmitting a TA indication that indicates the TA value. In some aspects, transmitting the TA indication comprises transmitting a MAC CE that includes the TA indication.

In some aspects, the first expected reception time comprises a time difference between a first time and a second time, wherein the first time corresponds to a time of transmission a first bit of a first PDSCH communication associated with the first PDSCH, and wherein the second time comprises a time of reception of the first bit of the first PDSCH communication. In some aspects, the margin value comprises a UE-specific margin value. In some aspects, the UE-specific margin value is based on at least one of a cell size, an estimated distance between the UE and the network node, or a cyclic prefix length. In some aspects, the margin value is less than or equal to a quotient of a division of a cyclic prefix associated with the second carrier by a constant.

In some aspects, the margin value comprises a frequency drift value. In some aspects, process 900 includes transmitting an indication of a range of potential frequency drift values including the frequency drift value. In some aspects, the synchronization information includes the indication of the range of potential frequency drift values.

In some aspects, a time window, for monitoring, based on the synchronization information, a second PDSCH associated with the second carrier, is based on an estimated time difference between a first expected reception time corresponding to a first PDSCH associated with the first carrier and a second expected reception time corresponding to a second PDSCH associated with the second carrier. In some aspects, the first expected reception time comprises a TA value associated with the first carrier.

In some aspects, process 900 includes transmitting a first reference signal associated with the first carrier, and transmitting a second reference signal associated with the second carrier, wherein the estimated time difference between the first expected reception time and the second expected reception time is based on the first reference signal and the second reference signal. In some aspects, at least one of the first reference signal or the second reference signal comprises a TRS. In some aspects, the TRS comprises an aperiodic TRS (A-TRS). In some aspects, the A-TRS comprises a nonzero-power channel state information reference signal (CSI-RS) associated with an active TRS information value. In some aspects, the first reference signal comprises a first A-TRS and the second reference signal comprises a second A-TRS, wherein a first set of transmission parameters is associated with the first A-TRS and a second set of transmission parameters is associated with the second A-TRS, and wherein the second set of transmission parameters corresponds to the first set of transmission parameters. In some aspects, the first set of transmission parameters indicates at least one of a bandwidth associated with the first A-TRS, a period associated with the first A-TRS, or a resource block location associated with the first A-TRS.

In some aspects, process 900 includes receiving, during a time window associated with the second carrier, a RACH message, wherein the time window is based on a first TA estimate associated with the second carrier. In some aspects, the first TA estimate associated with the second carrier is based on a TA value associated with the first carrier. In some aspects, the first TA estimate associated with the second carrier is equal to the TA value associated with the first carrier. In some aspects, the first TA estimate associated with the second carrier is equal to a sum of the TA value and a TA margin value. In some aspects, the TA margin value is based on at least one of a cell size or a distance between the UE and a network node associated with a TA group corresponding to the second carrier.

In some aspects, the synchronization information indicates at least one of a RACH parameter associated with the second carrier and the TA margin value. In some aspects, process 900 includes transmitting a MAC CE that indicates at least one of a RACH parameter associated with the second carrier and the TA margin value.

In some aspects, the second carrier comprises an uplink-only carrier.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
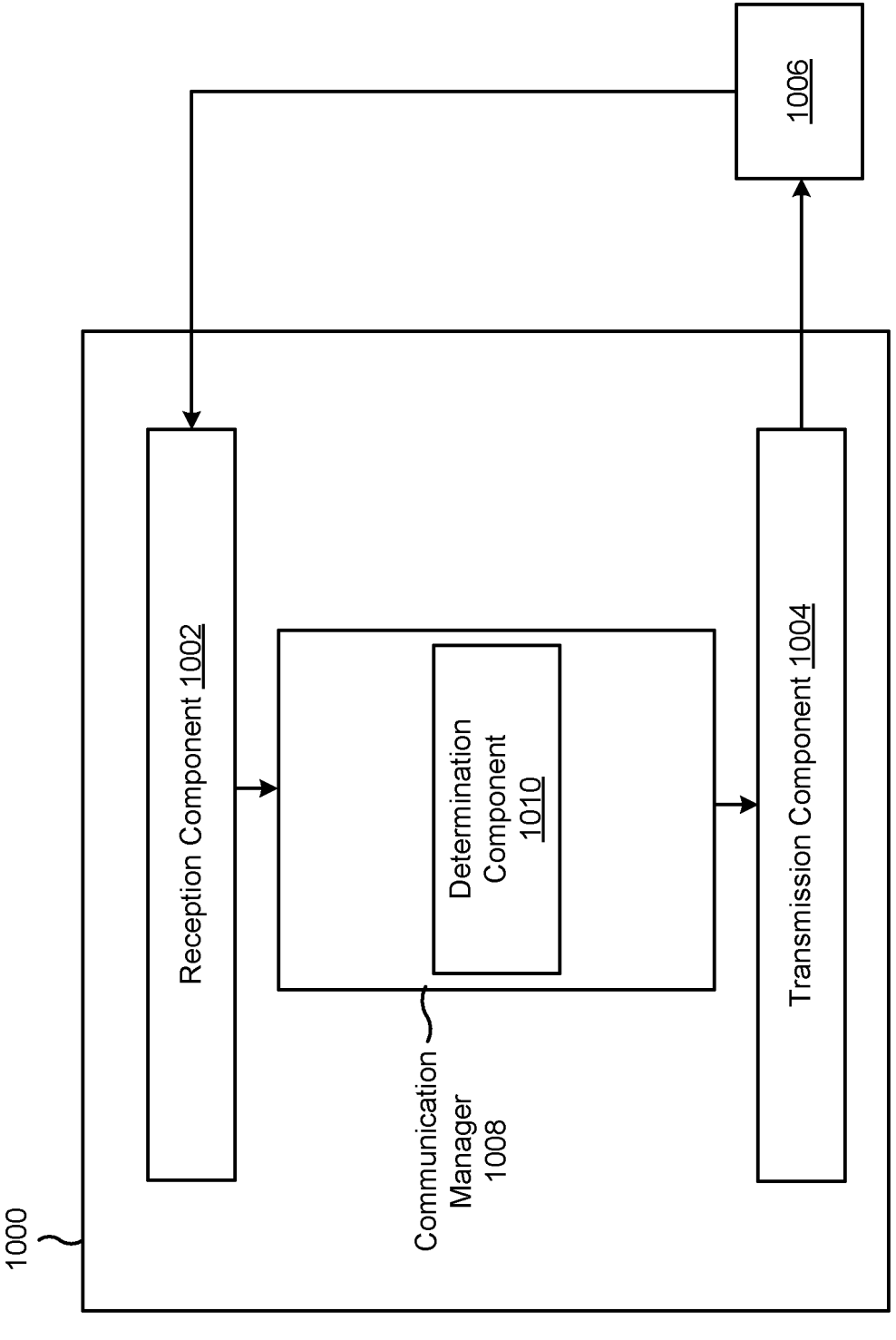
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008. The communication manager 1008 may include a determination component 1010.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some examples, means for transmitting, outputting, sending, or outputting for transmission may include one or more antennas, a modulator, a transmit MIMO processor, a transmit processor, or a combination thereof, of the UE described above in connection with FIG. 2.

In some examples, means for obtaining or receiving may include one or more antennas, a demodulator, a MIMO detector, a receive processor, or a combination thereof, of the UE described above in connection with FIG. 2.

In some cases, an apparatus may include an interface to output signals and/or data for transmission (a means for outputting). For example, a processor may output signals and/or data, via a bus interface, to an RF front end for transmission. Similarly, an apparatus may include an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, means for transmitting, means for communicating, and/or means for determining may include various processing system components, such as a receive processor, a transmit processor, a controller/processor, a memory, or a combination thereof, of the UE described above in connection with FIG. 2.

The communication manager 1008 and/or the reception component 1002 may receive, from a network node associated with a first carrier, a DCI transmission indicative of synchronization information corresponding to a second carrier, wherein the second carrier comprises an SSB-less carrier. In some aspects, the communication manager 1008 may include one or more antennas, a modem, a controller/processor, a memory, or a combination thereof, of the UE described in connection with FIG. 2. In some aspects, the communication manager 1008 may include the reception component 1002 and/or the transmission component 1004. In some aspects, the communication manager 1008 may be, be similar to, include, or be included in, the communication manager 140 depicted in FIGS. 1 and 2.

The communication manager 1008, the reception component 1002, and/or the transmission component 1004 may communicate via the second carrier based on the synchronization information. The communication manager 1008 and/or the reception component 1002 may receive a TA indication that indicates the TA value. The communication manager 1008 and/or the reception component 1002 may receive an indication of a range of potential frequency drift values including the frequency drift value. The communication manager 1008 and/or the reception component 1002 may receive a first reference signal associated with the first carrier. The communication manager 1008 and/or the reception component 1002 may receive a second reference signal associated with the second carrier.

The communication manager 1008 and/or the determination component 1010 may determine the estimated time difference between the first expected reception time and the second expected reception time based on the first reference signal and the second reference signal. In some aspects, the determination component 1010 may include one or more antennas, a modem, a controller/processor, a memory, or a combination thereof, of the UE described in connection with FIG. 2. In some aspects, the determination component 1010 may include the reception component 1002 and/or the transmission component 1004. The communication manager 1008 and/or the reception component 1002 may receive a MAC CE that indicates at least one of a RACH parameter associated with the second carrier and the TA margin value.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
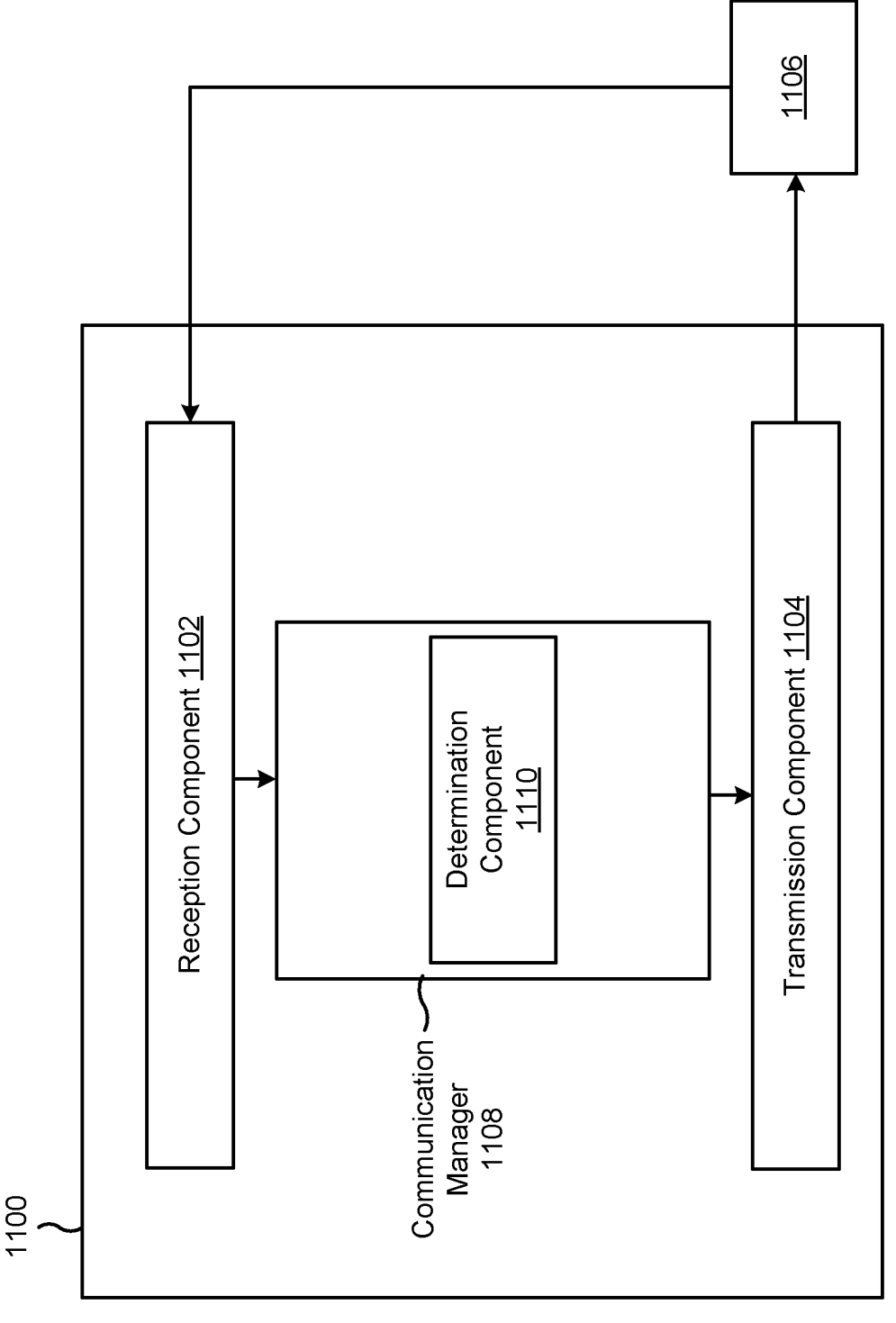
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108. The communication manager 1108 may include a determination component 1110.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

In some examples, means for transmitting, outputting, sending, or outputting for transmission may include one or more antennas, a modulator, a transmit MIMO processor, a transmit processor, or a combination thereof, of the network node described above in connection with FIG. 2.

In some examples, means for obtaining or receiving may include one or more antennas, a demodulator, a MIMO detector, a receive processor, or a combination thereof, of the network node described above in connection with FIG. 2.

In some cases, an apparatus may include an interface to output signals and/or data for transmission (a means for outputting). For example, a processor may output signals and/or data, via a bus interface, to an RF front end for transmission. Similarly, an apparatus may include an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, means for transmitting, means for communicating, and/or means for determining may include various processing system components, such as a receive processor, a transmit processor, a controller/processor, a memory, or a combination thereof, of the network node described above in connection with FIG. 2.

The communication manager 1108 and/or the determination component 1110 may determine synchronization information corresponding to a second carrier, wherein the second carrier comprises an SSB-less carrier. In some aspects, the communication manager 1108 may include one or more antennas, a modem, a controller/processor, a memory, or a combination thereof, of the network node described in connection with FIG. 2. In some aspects, the communication manager 1108 may include the reception component 1102 and/or the transmission component 1104. In some aspects, the communication manager 1108 may be, be similar to, include, or be included in, the communication manager 150 depicted in FIGS. 1 and 2. In some aspects, the determination component 1110 may include one or more antennas, a modem, a controller/processor, a memory, or a combination thereof, of the network node described in connection with FIG. 2. In some aspects, the determination component 1110 may include the reception component 1102 and/or the transmission component 1104.

The communication manager 1108 and/or the transmission component 1104 may transmit, via the first carrier and to a UE, a DCI transmission indicative of the synchronization information. The communication manager 1108 and/or the transmission component 1104 may transmit a TA indication that indicates the TA value. The communication manager 1108 and/or the transmission component 1104 may transmit an indication of a range of potential frequency drift values including the frequency drift value. The communication manager 1108 and/or the transmission component 1104 may transmit a first reference signal associated with the first carrier. The communication manager 1108 and/or the transmission component 1104 may transmit a second reference signal associated with the second carrier, wherein the estimated time difference between the first expected reception time and the second expected reception time is based on the first reference signal and the second reference signal.

The reception component 1102 may receive, during a time window associated with the second carrier, a RACH message, wherein the time window is based on a first TA estimate associated with the second carrier. The transmission component 1104 may transmit a MAC CE that indicates at least one of a RACH parameter associated with the second carrier and the TA margin value.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network node associated with a first carrier, a downlink control information (DCI) transmission indicative of synchronization information corresponding to a second carrier, wherein the second carrier comprises a synchronization-signal-block-less (SSB-less) carrier; and communicating via the second carrier based on the synchronization information.

Aspect 2: The method of Aspect 1, wherein the DCI transmission includes a carrier indication field indicative of the second carrier.

Aspect 3: The method of either of Aspects 1 or 2, wherein communicating via the second carrier based on the synchronization information comprises monitoring a second physical downlink shared channel (PDSCH) during a time window, wherein the time window is based on a first expected reception time corresponding to a first PDSCH associated with the first carrier and a margin value.

Aspect 4: The method of Aspect 3, wherein the time window is further based on an unsynchronized time difference value or a maximum unsynchronized time difference value.

Aspect 5: The method of Aspect 4, wherein the synchronization information indicates at least one of the margin value or the unsynchronized time difference value.

Aspect 6: The method of any of Aspects 3-5, wherein the first expected reception time comprises a timing advance (TA) value associated with the first carrier.

Aspect 7: The method of Aspect 6, further comprising receiving a TA indication that indicates the TA value.

Aspect 8: The method of Aspect 7, wherein receiving the TA indication comprises receiving a medium access control control element that includes the TA indication.

Aspect 9: The method of any of Aspects 3-5, wherein the first expected reception time comprises a time difference between a first time and a second time, wherein the first time corresponds to a time of transmission of a first bit of a first PDSCH communication associated with the first PDSCH, and wherein the second time comprises a time of reception of the first bit of the first PDSCH communication.

Aspect 10: The method of any of Aspects 3-9, wherein the margin value comprises a UE-specific margin value.

Aspect 11: The method of Aspect 10, wherein the UE-specific margin value is based on at least one of a cell size, an estimated distance between the UE and the network node, or a cyclic prefix length.

Aspect 12: The method of any of Aspects 3-11, wherein the margin value is less than or equal to a quotient of a division of a cyclic prefix associated with the second carrier by a constant.

Aspect 13: The method of any of Aspects 3-12, wherein the margin value comprises a frequency drift value.

Aspect 14: The method of Aspect 13, further comprising receiving an indication of a range of potential frequency drift values including the frequency drift value.

Aspect 15: The method of Aspect 14, wherein the synchronization information includes the indication of the range of potential frequency drift values.

Aspect 16: The method of either of Aspects 14 or 15, wherein communicating via the second carrier based on the synchronization information comprises monitoring each of the potential frequency drift values in the range of potential frequency drift values.

Aspect 17: The method of any of Aspects 1-16, wherein communicating via the second carrier based on the synchronization information comprises monitoring a second physical downlink shared channel (PDSCH) during a time window, wherein the time window is based on an estimated time difference between a first expected reception time corresponding to a first PDSCH associated with the first carrier and a second expected reception time corresponding to a second PDSCH associated with the second carrier.

Aspect 18: The method of Aspect 17, wherein the first expected reception time comprises a timing advance (TA) value associated with the first carrier.

Aspect 19: The method of either of Aspects 17 or 18, further comprising: receiving a first reference signal associated with the first carrier; receiving a second reference signal associated with the second carrier; and determining the estimated time difference between the first expected reception time and the second expected reception time based on the first reference signal and the second reference signal.

Aspect 20: The method of Aspect 19, wherein at least one of the first reference signal or the second reference signal comprises a tracking reference signal (TRS).

Aspect 21: The method of Aspect 20, wherein the TRS comprises an aperiodic TRS (A-TRS).

Aspect 22: The method of Aspect 21, wherein the A-TRS comprises a nonzero-power channel state information reference signal (CSI-RS) associated with an active TRS information value.

Aspect 23: The method of either of Aspects 21 or 22, wherein the first reference signal comprises a first A-TRS and the second reference signal comprises a second A-TRS, wherein a first set of transmission parameters is associated with the first A-TRS and a second set of transmission parameters is associated with the second A-TRS, and wherein the second set of transmission parameters corresponds to the first set of transmission parameters.

Aspect 24: The method of Aspect 23, wherein the first set of transmission parameters indicates at least one of a bandwidth associated with the first A-TRS, a period associated with the first A-TRS, or a resource block location associated with the first A-TRS.

Aspect 25: The method of any of Aspects 1-24, wherein communicating via the second carrier based on the synchronization information comprises transmitting a random access channel (RACH) message during a time window, wherein the time window is based on a first timing advance (TA) estimate associated with the second carrier.

Aspect 26: The method of Aspect 25, wherein the first TA estimate associated with the second carrier is based on a TA value associated with the first carrier.

Aspect 27: The method of Aspect 26, wherein the first TA estimate associated with the second carrier is equal to the TA value associated with the first carrier.

Aspect 28: The method of Aspect 26, wherein the first TA estimate associated with the second carrier is equal to a sum of the TA value and a TA margin value.

Aspect 29: The method of Aspect 28, wherein the TA margin value is based on at least one of a cell size or a distance between the UE and a network node associated with a TA group corresponding to the second carrier.

Aspect 30: The method of either of Aspects 28 or 29, wherein the synchronization information indicates at least one of a RACH parameter associated with the second carrier and the TA margin value.

Aspect 31: The method of any of Aspects 28-30, further comprising receiving a medium access control control element that indicates at least one of a RACH parameter associated with the second carrier and the TA margin value.

Aspect 32: The method of any of Aspects 1-31, wherein the second carrier comprises an uplink-only carrier.

Aspect 33: A method of wireless communication performed by a network node associated with a first carrier, comprising: determining synchronization information corresponding to a second carrier, wherein the second carrier comprises a synchronization-signal-block-less (SSB-less) carrier, and transmitting, via the first carrier and to a user equipment (UE), a downlink control information (DCI) transmission indicative of the synchronization information.

Aspect 34: The method of Aspect 33, wherein the DCI transmission includes a carrier indication field indicative of the second carrier.

Aspect 35: The method of either of Aspects 33 or 34, wherein a time window for monitoring, based on the synchronization information, a second physical downlink shared channel (PDSCH) associated with the second carrier, is based on a first expected reception time corresponding to a first PDSCH associated with the first carrier and a margin value.

Aspect 36: The method of Aspect 35, wherein the time window is further based on an unsynchronized time difference value or a maximum unsynchronized time difference value.

Aspect 37: The method of Aspect 36, wherein the synchronization information indicates at least one of the margin value or the unsynchronized time difference value.

Aspect 38: The method of any of Aspects 35-37, wherein the first expected reception time comprises a timing advance (TA) value associated with the first carrier.

Aspect 39: The method of Aspect 38, further comprising transmitting a TA indication that indicates the TA value.

Aspect 40: The method of Aspect 39, wherein transmitting the TA indication comprises transmitting a medium access control control element that includes the TA indication.

Aspect 41: The method of any of Aspects 35-37, wherein the first expected reception time comprises a time difference between a first time and a second time, wherein the first time corresponds to a time of transmission of a first bit of a first PDSCH communication associated with the first PDSCH, and wherein the second time comprises a time of reception of the first bit of the first PDSCH communication.

Aspect 42: The method of any of Aspects 35-41, wherein the margin value comprises a UE-specific margin value.

Aspect 43: The method of Aspect 42, wherein the UE-specific margin value is based on at least one of a cell size, an estimated distance between the UE and the network node, or a cyclic prefix length.

Aspect 44: The method of any of Aspects 35-43, wherein the margin value is less than or equal to a quotient of a division of a cyclic prefix associated with the second carrier by a constant.

Aspect 45: The method of any of Aspects 35-44, wherein the margin value comprises a frequency drift value.

Aspect 46: The method of Aspect 45, further comprising transmitting an indication of a range of potential frequency drift values including the frequency drift value.

Aspect 47: The method of Aspect 46, wherein the synchronization information includes the indication of the range of potential frequency drift values.

Aspect 48: The method of any of Aspects 33-47, wherein a time window, for monitoring, based on the synchronization information, a second physical downlink shared channel (PDSCH) associated with the second carrier, is based on an estimated time difference between a first expected reception time corresponding to a first PDSCH associated with the first carrier and a second expected reception time corresponding to a second PDSCH associated with the second carrier.

Aspect 49: The method of Aspect 48, wherein the first expected reception time comprises a timing advance (TA) value associated with the first carrier.

Aspect 50: The method of either of Aspects 48 or 49, further comprising: transmitting a first reference signal associated with the first carrier, and transmitting a second reference signal associated with the second carrier; wherein the estimated time difference between the first expected reception time and the second expected reception time is based on the first reference signal and the second reference signal.

Aspect 51: The method of Aspect 50, wherein at least one of the first reference signal or the second reference signal comprises a tracking reference signal (TRS).

Aspect 52: The method of Aspect 51, wherein the TRS comprises an aperiodic TRS (A-TRS).

Aspect 53: The method of Aspect 52, wherein the A-TRS comprises a nonzero-power channel state information reference signal (CSI-RS) associated with an active TRS information value.

Aspect 54: The method of either of Aspects 52 or 53, wherein the first reference signal comprises a first A-TRS and the second reference signal comprises a second A-TRS, wherein a first set of transmission parameters is associated with the first A-TRS and a second set of transmission parameters is associated with the second A-TRS, and wherein the second set of transmission parameters corresponds to the first set of transmission parameters.

Aspect 55: The method of Aspect 54, wherein the first set of transmission parameters indicates at least one of a bandwidth associated with the first A-TRS, a period associated with the first A-TRS, or a resource block location associated with the first A-TRS.

Aspect 56: The method of any of Aspects 33-55, further comprising receiving, during a time window associated with the second carrier, a random access channel (RACH) message, wherein the time window is based on a first timing advance (TA) estimate associated with the second carrier.

Aspect 57: The method of Aspect 56, wherein the first TA estimate associated with the second carrier is based on a TA value associated with the first carrier.

Aspect 58: The method of Aspect 57, wherein the first TA estimate associated with the second carrier is equal to the TA value associated with the first carrier.

Aspect 59: The method of Aspect 57, wherein the first TA estimate associated with the second carrier is equal to a sum of the TA value and a TA margin value.

Aspect 60: The method of Aspect 59, wherein the TA margin value is based on at least one of a cell size or a distance between the UE and a network node associated with a TA group corresponding to the second carrier.

Aspect 61: The method of either of Aspects 59 or 60, wherein the synchronization information indicates at least one of a RACH parameter associated with the second carrier and the TA margin value.

Aspect 62: The method of any of Aspects 59-61, further comprising transmitting a medium access control control element that indicates at least one of a RACH parameter associated with the second carrier and the TA margin value.

Aspect 63: The method of any of Aspects 33-62, wherein the second carrier comprises an uplink-only carrier.

Aspect 64: An apparatus for wireless communication at a device, comprising a processor; memory coupled with the processor; and instructions stored in the memory and executable by the processor to cause the apparatus to perform the method of one or more of Aspects 1-32.

Aspect 65: A device for wireless communication, comprising one or more memories and one or more processors coupled to the one or more memories, the one or more processors configured to cause the device to perform the method of one or more of Aspects 1-32.

Aspect 66: An apparatus for wireless communication, comprising at least one means for performing the method of one or more of Aspects 1-32.

Aspect 66: A non-transitory computer-readable medium storing code for wireless communication, the code comprising instructions executable by a processor to perform the method of one or more of Aspects 1-32.

Aspect 67: A non-transitory computer-readable medium storing a set of instructions for wireless communication, the set of instructions comprising one or more instructions that, when executed by one or more processors of a device, cause the device to perform the method of one or more of Aspects 1-32.

Aspect 68: An apparatus for wireless communication at a device, comprising a processor; memory coupled with the processor; and instructions stored in the memory and executable by the processor to cause the apparatus to perform the method of one or more of Aspects 33-63.

Aspect 69: A device for wireless communication, comprising one or more memories and one or more processors coupled to the one or more memories, the one or more processors configured to cause the device to perform the method of one or more of Aspects 33-63.

Aspect 70: An apparatus for wireless communication, comprising at least one means for performing the method of one or more of Aspects 33-63.

Aspect 71: A non-transitory computer-readable medium storing code for wireless communication, the code comprising instructions executable by a processor to perform the method of one or more of Aspects 33-63.

Aspect 72: A non-transitory computer-readable medium storing a set of instructions for wireless communication, the set of instructions comprising one or more instructions that, when executed by one or more processors of a device, cause the device to perform the method of one or more of Aspects 33-63.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, which are configured, individually or in any combination, to:

receive, from a network node associated with a first carrier, a downlink control information (DCI) transmission indicative of synchronization information corresponding to a second carrier, wherein the second carrier comprises a synchronization-signal-block-less (SSB-less) carrier; and communicate via the second carrier based on the synchronization information, wherein the one or more processors, to cause the UE to communicate via the second carrier based on the synchronization information, are configured to cause the UE to monitor a second physical downlink shared channel (PDSCH) during a time window, wherein the time window is based on a first expected reception time corresponding to a first PDSCH associated with the first carrier and a margin value.

2. The UE of claim 1, wherein the DCI transmission includes a carrier indication field indicative of the second carrier.

3. The UE of claim 1, wherein the time window is further based on an unsynchronized time difference value or a maximum unsynchronized time difference value, wherein the synchronization information indicates at least one of the margin value or the unsynchronized time difference value.

4. The UE of claim 1, wherein the first expected reception time comprises a timing advance (TA) value associated with the first carrier.

5. The UE of claim 4, wherein the one or more processors are further configured to cause the UE to receive a TA indication that indicates the TA value.

6. The UE of claim 1, wherein the first expected reception time comprises a time difference between a first time and a second time, wherein the first time corresponds to a time of transmission of a first bit of a first PDSCH communication associated with the first PDSCH, and wherein the second time comprises a time of reception of the first bit of the first PDSCH communication.

7. The UE of claim 1, wherein the margin value comprises a UE-specific margin value, wherein the UE-specific margin value is based on at least one of a cell size, an estimated distance between the UE and the network node, or a cyclic prefix length.

8. The UE of claim 1, wherein the margin value is less than or equal to a quotient of a division of a cyclic prefix associated with the second carrier by a constant.

9. The UE of claim 1, wherein the margin value comprises a frequency drift value.

10. The UE of claim 9, wherein the one or more processors are further configured to cause the UE to receive an indication of a range of potential frequency drift values including the frequency drift value.

11. The UE of claim 10, wherein the synchronization information includes the indication of the range of potential frequency drift values.

12. The UE of claim 10, wherein the one or more processors, to cause the UE to communicate via the second carrier based on the synchronization information, are configured to cause the UE to monitor each of the potential frequency drift values in the range of potential frequency drift values.

13. The UE of claim 1, wherein the second carrier comprises an uplink-only carrier.

14. A network node for wireless communication, comprising:

one or more memories; and one or more processors coupled to the one or more memories, which are configured, individually or in any combination, to:

determine synchronization information corresponding to a second carrier, wherein the second carrier comprises a synchronization-signal-block-less (SSB-less) carrier; and transmit, via a first carrier and to a user equipment (UE), a downlink control information (DCI) transmission indicative of the synchronization information, wherein a time window for monitoring, based on the synchronization information, a second physical downlink shared channel (PDSCH) associated with the second carrier is based on a first expected reception time corresponding to a first PDSCH associated with the first carrier and a margin value.

15. The network node of claim 14, wherein the second carrier comprises an uplink-only carrier.

16. A method of wireless communication performed by a user equipment (UE), comprising:

receiving, from a network node associated with a first carrier, a downlink control information (DCI) transmission indicative of synchronization information corresponding to a second carrier, wherein the second carrier comprises a synchronization-signal-block-less (SSB-less) carrier; and communicating via the second carrier based on the synchronization information, wherein the communicating comprises monitoring a second physical downlink shared channel (PDSCH) during a time window, wherein the time window is based on a first expected reception time corresponding to a first PDSCH associated with the first carrier and a margin value.

17. The method of claim 16, wherein the DCI transmission includes a carrier indication field indicative of the second carrier.

18. A method of wireless communication performed by a network node associated with a first carrier, comprising:

determining synchronization information corresponding to a second carrier, wherein the second carrier comprises a synchronization-signal-block-less (SSB-less) carrier; and transmitting, via the first carrier and to a user equipment (UE), a downlink control information (DCI) transmission indicative of the synchronization information, wherein a time window for monitoring, based on the synchronization information, a second physical downlink shared channel (PDSCH) associated with the second carrier is based on a first expected reception time corresponding to a first PDSCH associated with the first carrier and a margin value.

19. The method of claim 18, wherein the DCI transmission includes a carrier indication field indicative of the second carrier.

20. The method of claim 16, wherein the time window is further based on an unsynchronized time difference value or a maximum unsynchronized time difference value, wherein the synchronization information indicates at least one of the margin value or the unsynchronized time difference value.

21. The method of claim 16, wherein the first expected reception time comprises a timing advance (TA) value associated with the first carrier.

22. The method of claim 21, further comprising:

receiving a TA indication that indicates the TA value.

23. The method of claim 16, wherein the first expected reception time comprises a time difference between a first time and a second time, wherein the first time corresponds to a time of transmission of a first bit of a first PDSCH communication associated with the first PDSCH, and wherein the second time comprises a time of reception of the first bit of the first PDSCH communication.

24. The method of claim 16, wherein the margin value comprises a UE-specific margin value, wherein the UE-specific margin value is based on at least one of a cell size, an estimated distance between the UE and the network node, or a cyclic prefix length.

25. The method of claim 16, wherein the margin value is less than or equal to a quotient of a division of a cyclic prefix associated with the second carrier by a constant.

26. The method of claim 16, wherein the margin value comprises a frequency drift value.

27. The method of claim 26, further comprising:
receiving an indication of a range of potential frequency drift values including the frequency drift value.

28. The method of claim 27, wherein the synchronization information includes the indication of the range of potential frequency drift values.

29. The method of claim 27, further comprising:
monitoring each of the potential frequency drift values in the range of potential frequency drift values.

30. The network node of claim 14, wherein the DCI transmission includes a carrier indication field indicative of the second carrier.

\* \* \* \* \*